April 30, 1935. D. REPONY 1,999,256

BELT

Filed Jan. 8, 1932

INVENTOR
DANIEL REPONY
BY HIS ATTORNEYS

Patented Apr. 30, 1935

1,999,256

UNITED STATES PATENT OFFICE 1,999,256

BELT

Daniel Repony, Clifton, N. J., assignor to Raybestos-Manhattan, Inc., Passaic, N. J., a corporation of New Jersey Application January 8, 1932, Serial No. 585,449

1 Claim. (Cl. 74—232)

This invention relates to a laminated fabric and method of making the same, and particularly to a fabric adapted for use as a transmission belt having a thin layer of rubber on its friction surface, which rubber layer is anchored throughout to a fabric layer by means of fibres or threads, etc., which permeate the rubber layer and are interwoven in the fabric layer.

Prior to my invention, it was known that a superior friction surface would be obtained by coating a transmission belt with rubber. When, however, this has been tried, it has been found that the rubber coating does not satisfactorily adhere to the fabric, and that long before the fabric layers of the belting are impaired, the rubber layer has been partly or entirely stripped away, and often the shreds of rubber which have been stripped from this rubber coating become bunched and more or less cemented together by heat or by belt dressing, if dressing has been used, and the effect of these lumps of rubber passing over the pulleys is to cause a rapid deterioration of the fabric layers of the belt. Accordingly, in spite of the recognized advantages of a rubber surface, belts of this type have not proven practical and the idea has had to be practically abandoned.

I have now discovered that if the belt is made with an outer layer of its fabric having a nap on its exposed side, that the rubber may be deposited in and around the threads or fibres of the nap, and may thereby be so securely anchored to the fabric layer as to prevent the objectionable stripping away, and to preserve the rubber surface layer intact throughout the useful life of the belt. I have found that this may be accomplished in various ways, as by saturating the nap with a rubber solution or dispersion, e. g., a stabilized latex, or by working a thin layer of rubber in a plastic state into the surface of the nap fabric. In this latter case, the rubber may advantageously be softened by means of solvents or softeners, so as to permit more thorough intermingling of the threads or fibres of the nap with the applied layer of rubber.

Figure 1:
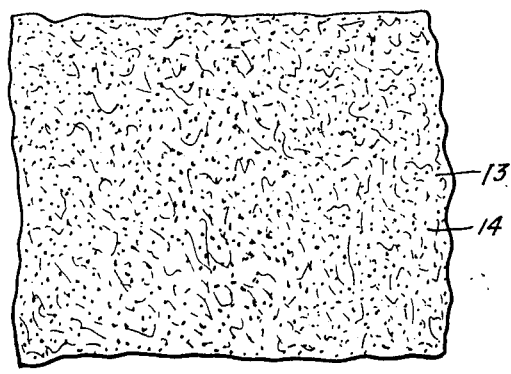
Figure 2:
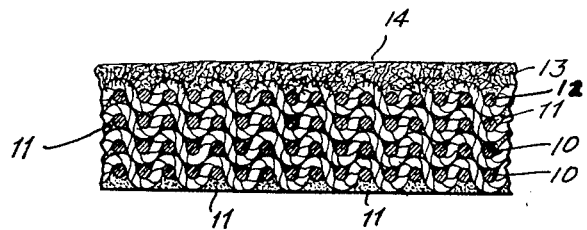

In the accompanying drawing,

Fig. 1 shows the upper surface of a belt made according to the present invention; and Fig. 2 is a cross-sectional view of the laminated fabric of which the belt of Fig. 1 is made.

As shown in Fig. 2, the belt of the preferred form is made of superimposed layers of canvas fabric 10 which are impregnated and cemented together by films of rubber indicated by the reference character 11. A surface fabric layer 12 has a nap composed of loose fibres 13 which extend away from its upper surface, and surrounding and permeating its nap is a layer of rubber 14.

In the manufacture of this belt, layers of strong canvas duck 10 are first frictioned or impregnated with rubber, and are then plied up to the desired thickness which will carry the necessary stress to be encountered in the power transmission for which the belt is intended, and a special surface layer is secured to at least one face of the belt. This surface fabric layer 12 has its outer surface formed of the loose ends of fibres individually or in threads as in a nap or pile, and in the preferred embodiment of my invention is a cotton flannel made from high grade cotton fibre and having a nap on only one side. This surface, which is formed of the loose ends of fibres, is coated with latex or a solution of rubber in a volatile solvent, or rubber in any other form which is sufficiently soft to permit of thorough intermingling of the rubber and the fibre of the nap. The other side of this fabric may be frictioned or coated in any other way with rubber, or instead of coating the two sides separately, the fabric may be passed through a bath of latex or rubber solution. Instead of coating the two sides of the layer 12 separately, the flannel, or other nap fabric may be passed through a bath of latex or rubber solution, or may be simultaneously coated on both sides by means of friction rolls, etc.

With the various layers coated as described above, they are plied up, one upon another, as shown in Fig. 2, and are then vulcanized, e. g., in a belting press such as is commonly used for this type of work. During vulcanization, the rubber will tend further to flow around and into the threads and fibres both of the nap and of the woven fabric layers, and to form a homogeneous strongly coherent structure. Furthermore, although the friction surface of the belt will be largely or entirely of rubber, nevertheless, the threads or fibres of the nap will be thoroughly and substantially uniformly intermingled with the rubber, so that any tendency of the rubber to strip from the fabric will be resisted by the direct pull of the nap, and consequently the rubber layer will be thoroughly and securely anchored throughout to the fabric layers.

The rubber surface layer should, for best results, not be substantially thicker than can be thoroughly permeated by the threads or fibres of the nap. I have found that a thickness approximating that of the fabric layer, e. g., about $\frac{1}{16}$ of an inch, more or less, will give very satisfactory results. This surface layer may advantageously be an abrasion resisting and high tensile strength rubber composition, similar, for example, to tread stock used in automobile tires.

Although I have described only a preferred embodiment of my invention and suggested certain modifications and changes therein, it will be understood that many other changes may be made within the scope of my invention. Thus, many other types of fabric whose surface is formed of the loose ends of fibres may be used instead of flannel, such, for example, as terry cloth or velvet-like fabrics or fabric similar to carpeting, and other stress resisting fabrics may be used instead of duck, for example, weftless cord fabric, or other types of woven fabric, and in some cases other flexible binders or friction surface materials may be used in place of rubber and rubber compositions, as, for example, compositions of so-called artificial rubber, or of vulcanized or dried oils.

What I claim is:

A friction belt for power driven apparatus, the friction surface of which is composed predominantly of rubber, which comprises stress resisting layers of belting material, a layer of fabric having a surface formed of the loose ends of fibres, said fabric being secured to said belting material on the side thereof toward the friction surface, and a surface layer of rubber into which the loose ends of said surface are intimately incorporated and covered by the rubber, whereby the rubber forms the major part of the friction surface and is securely anchored to the fabric by said loose ends.

DANIEL REPONY.